United States Patent [19]

Korsch

[11] 4,101,195
[45] Jul. 18, 1978

[54] ANASTIGMATIC THREE-MIRROR TELESCOPE

[76] Inventors: Robert A. Frosch, Administrator of the National Aeronautics and Space Administration, with respect to an invention of Dietrich G. Korsch, Huntsville, Ala.

[21] Appl. No.: 820,498

[22] Filed: Jul. 29, 1977

[51] Int. Cl.² .................. G02B 17/06; G02B 23/06
[52] U.S. Cl. .................................... 350/55; 350/294
[58] Field of Search .............. 350/294, 296, 55, 27, 350/200

[56] References Cited

U.S. PATENT DOCUMENTS 3,674,334  7/1972  Offner .......................... 350/5 S

OTHER PUBLICATIONS

Gelles, App. Optics, vol. 12, No. 5, May, 1973, p. 935.

Primary Examiner—Jon W. Henry
Attorney, Agent, or Firm—George J. Porter; John R. Manning; L. D. Wofford, Jr.

[57] ABSTRACT

A three-mirror telescope having an ellipsoidal primary mirror, a hyperbolic secondary mirror, and an ellipsoidal tertiary mirror, with the three producing an image in a conveniently located finite plane for viewing.

4 Claims, 4 Drawing Figures

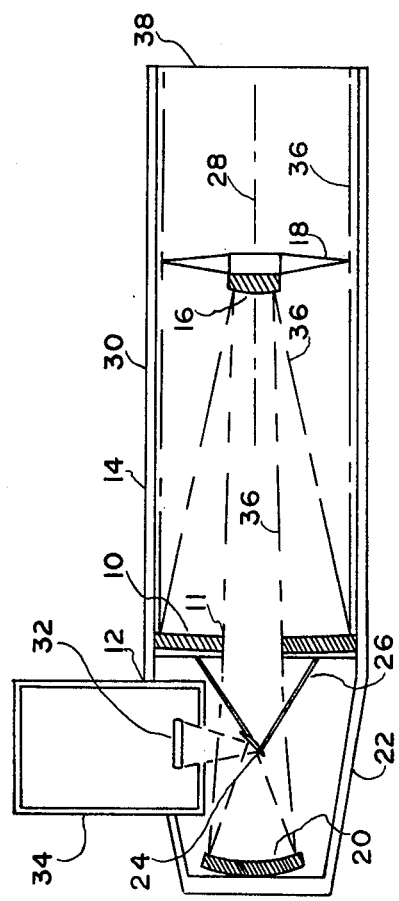
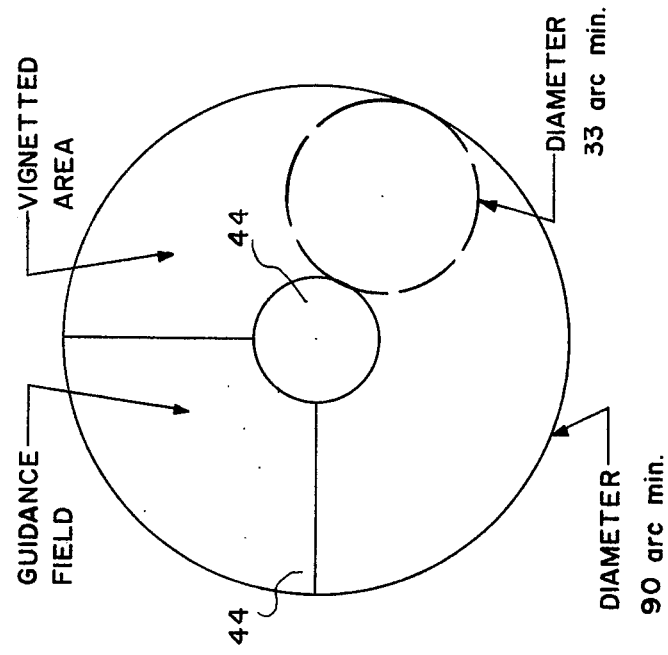
FIG. 1
FIG. 3

ANASTIGMATIC THREE-MIRROR TELESCOPE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

This invention relates to telescopes, and particularly to an improved three-mirror telescope.

2. General Description of the Prior Art

The performance of a conventional high quality telescope when used on the earth for celestial viewing is principally limited to the earth's atmosphere rather than by the construction of the telescope. Atmospheric effects not only limit the resolution of a telescope to approximately one arc second, but also absorb large portions of the electromagnetic spectral range. While a decade or so ago little could be done about this limitation, today, with the help of earth satellites and other space vehicles, it is possible to place a telescope above the atmosphere and perform extraterrestial observations without interference from it. As a result, there has arisen a need for a telescope which can more fully take advantage of this new environment. Sought is a telescope which has a higher resolution over a wider field of view (equal to or greater than 1°) and one having a greater spectral range, ideally extending from the far ultraviolet to the far infrared. It is immediately seen that to obtain the latter feature, the telescope must be an all-reflective type in order to avoid lens transmission losses, particularly at extremes of the spectral range. The first choice from existing types of reflecting telescopes would appear to be the Richey-Chretien telescope, which is an improved version of the classical Cassegrain telescope. The Ritchey-Chretien telescope is a two-mirror telescope and can, unfortunately, provide a high resolution field of only a few arc min, and it outputs a curved image field. To widen and flatten the field of this telescope, it is normally used in conjunction with refractive correctors, but refractive correctors are essentially operative only in the visual portion of the spectrum, and thus the desired wider spectral range cannot be obtained with this telescope.

As perhaps a most logical step toward improvement, several three-mirror telescopes have been proposed as possible solutions, and these have been described in the following publications:

1. Paul, M. Revue D'Optique, 14, No. 5, 1935, p.13.
2. Baker, J. E., IEEE Trans. Aer. El. Sys., Vol. AES-5, No. 2, 1969.
3. Lagrula, Jr., Cahiers de Phys., 1942, pp. 8–43.
4. Korsch, D., Appl. Opt., Vol. 11, No. 12, 1972, p. 2986.
5. Shack, R. V. and Meinel, A.B., J.O.S.A., 56, 1966, p. 545.
6. Rumsey, N. J., Proceedings, Opt. Instru. and Techniques, 1969, Oriel Press, p. 514.
7. Buchroeder, R. A. and Leonard, A. S., Appl. Opt., Vol. 11, No. 7, 1972, p. 1649.
8. Buchroeder, R. A., Technical Report No. 68, Opt. Sc. Center, University of Arizona, 1971.
9. Korsch, D., J.O.S.A., Vol. 63, 1973, p. 667.
10. Korsch, D., Appl. Opt., Vol. 13, 1974, p. 1767.

Despite these efforts, an examination of the three-mirror systems proposed by them indicates that none of them provide practical and sufficient solutions to the problems involved, each of the systems having one or more of the following short-comings:

1. Inaccessability of the image plane.
2. A large central obscuration.
3. Practically invariable fast focal ratios.
4. A largely asymmetric configuration.

In addition to the three-mirror telescopes disclosed by the foregoing references, two additional three-mirror telescopic designs have more recently appeared, one by the Itek Corporation, described in "Requirements and Concept Design for Large Earth Survey Telescope for SEOD", Final Report, NASA CR-144796 (1975), and one by the applicant, described in Optical Engineering, Vol. 14, No. 6, (1975), p. 533. While these mirror designs offer some advantage over previous ones, they still suffer the disadvantage that, because of their geometric configurations, only less than half of the well-corrected field can be used.

SUMMARY OF THE INVENTION

In accordance with the present invention, the aforementioned difficulties are quite substantially overcome by a three-mirror telescope wherein a primary-secondary configuration similar to the Cassegrain design forms a real image closely behind the primary mirror. This image is then re-imaged by a tertiary mirror at approximately unit magnification in a finite plane for viewing, this plane being parallel to but displaced from the axis of the primary and secondary mirrors. To achieve this, a plane mirror, which functions as a fold mirror, is positioned at an angle of 45° with respect to the image formed by the primary-secondary mirrors and either directs light from the secondary mirror to the tertiary mirror or reflects light from the tertiary mirror to a final image plane.

BRIEF DESCRIPTION OF THE DRAWINGS

FIG. 1 is a diagrammatic illustration of the cross section of a three-mirror telescope as contemplated by this invention.

FIG. 3 is a schematic illustration of the field distribution as would be observed at the final image plane of a telescope constructed in accordance with this invention.

DETAILED DESCRIPTION OF THE DRAWINGS

Figure 4:
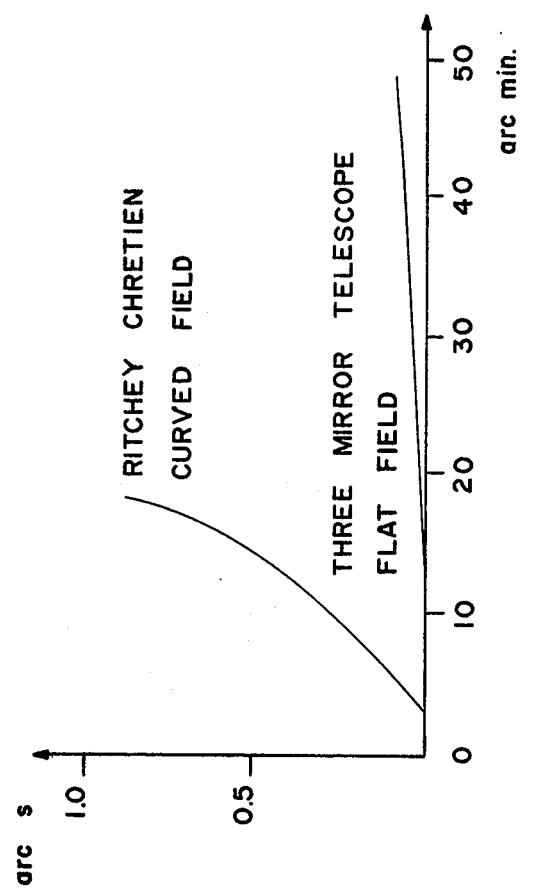
FIG. 4 is a graph illustrating a comparison of the performance of a telescope constructed in accordance with this invention and a conventional Ritchey-Chretien telescope.

Referring to FIG. 1, primary mirror 10, having a central opening 11, is positioned at end 12 of tube or tubular housing 14 and is an ellipsoid. Secondary mirror 16, which is supported in tube 14 by conventional spider support members 18, is a hyperbolic mirror. Tertiary mirror 20, supported by auxiliary support housing 22 (by means not shown), is an ellipsoid. Plane mirror 24, which is supported on spider members 26 at an angle of 45° with respect to the axis 28 of telescope 30, is made small to permit light to pass around it from secondary mirror 16 to tertiary mirror 20 and yet effectively receive light from tertiary mirror 20 and reflect it upward to image plane 32 of camera 34. Instead of a camera, an eyepiece could be positioned, for viewing through the telescope, at image plane 32.

Thus, in operation, rays 36 enter end 38 of tube 14 and pass around secondary mirror 16 and impinge on primary mirror 10 which reflects the rays onto secondary mirror 16. Rays 36 are then reflected by secondary mirror 16 onto tertiary mirror 20. Tertiary mirror 20 reflects the rays onto plane mirror 24, and this mirror reflects the rays upward to focal plane 32 where they are observed and recorded by camera 34, or otherwise viewed. The rays in FIG. 1 show the outside limits of the envelope of light throughout the telescope.

Figure 2:
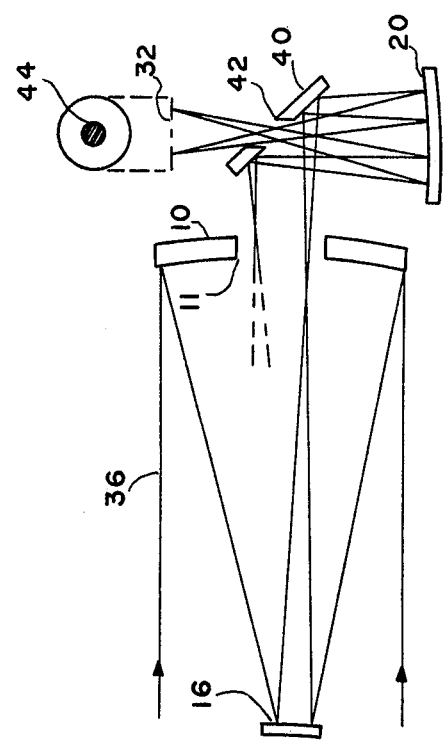
FIG. 2 is a schematic illustration of a modification of the telescope shown in FIG. 1.

In the alternate configuration shown in FIG. 2, a larger plane or fold mirror 40 directly receives rays 36 from secondary mirror 16 and reflects them to tertiary mirror 20. Rays 36 from tertiary mirror 20 are then reflected through an opening 42 in plane mirror 40 to final image plane 32. This configuration minimizes obscuration by avoiding the use of a spider 26, as shown in FIG. 1, that holds a small fold mirror 24, and at the same time significantly improves the baffling of the system. In fact, an additional advantage of this three-mirror configuration over the Cassegrain two-mirror configuration is its natural baffling property. In contrast, in the Cassegrain telescope, in order to protect the secondary image from stray light, fairly complex and elaborate baffling systems are required. Thus, in the present invention, the final image plane is inherently protected from stray light by the folded-out image plane and the location of exit pupil 42 being behind the tertiary mirror, which together form a bottleneck in the optical train. More particularly, with respect to the embodiment of the invention shown in FIG. 1, the only stray light that can reach the final image plane is that scattered off spider members 26 holding small fold mirror 24. However, the spider members are so far within the optical system that they will not be illuminated by the moon, earth or sun.

An even more efficient baffling effect is achieved with the configuration shown in FIG. 2. With this configuration, no stray light can reach an image plane after only a single scattering event. Even the light that is scattered off the edges around perforation 42 of fold mirror 40, and then reflected by the tertiary through exit pupil 42, will be intercepted by the central vignetted portion 44 rather than by the useful field. A further advantage is the accessability of the image of the spider holding the secondary mirror as formed by the tertiary mirror. It is located immediately behind exit pupil 42 and can, at least in the configuration of the invention shown in FIG. 2, easily be masked off, e.g., by a screen shape like the image of the spider.

The performance obtainable from telescopes constructed in accordance with this invention is demonstrated in FIG. 4 where such performance is compared to the performance of a Ritchey-Chretien telescope. The geometric spot size, i.e., the diameter of the smallest circle surrounding all rays traced through this system, is plotted as a function of field angle. As shown, the superior performance of such a three-mirror telescope is reflected in the significantly smaller spot size and in the fact that the field is flat, while the Ritchey-Chretien telescope has a curved field. The superiority of the three-mirror telescope of this invention over two-mirror telescopes is further demonstrated by the fact that while the latter can be corrected for maximally two aberrations, usually spherical aberration and coma, the former can be corrected for four aberrations, spherical aberration, coma, astigmatism, and field curvature. The mathematical conditions for correcting spherical aberrations, coma, and astigmatism can be written according to equations previously published by the applicant in J.O.S.A., Vol. 63, 1973, p. 667, and in Applied Optics, Vol. 13, 1974, p. 1967; and as an example, a list of final telescope parameters for a telescope constructed in accordance with the present invention would be as follows:

| | |
|---|---|
| Clear aperture | 150 cm |
| Primary F-No. | 2.2 |
| System F-No. | 12 |
| System focal length | 1,800 cm |
| Secondary diameter | 35 cm |
| Tertiary diameter | 80 cm |
| Exit pupil diameter | 5.2 cm |
| Secondary image diameter | 48.3 cm (1.5°) |
| Final image diameter | 47.1 cm (1.5°) |
| Primary radius | 660.0000 cm |
| Secondary radius | −126.9495 cm |
| Tertiary radius | 154.2855 cm |
| Primary deformation | −0.9702785 (ellipsoid) |
| Secondary deformation | −1.7448287 (hyperboloid) |
| Tertiary deformation | −0.5596906 |
| Secondary magnification | −5.6 |
| Tertiary magnification | 0.9740 |
| Distance: | |
| Primary-secondary | 277.8600 cm |
| Secondary-tertiary | 448.3266 cm |
| Tertiary-exit pupil | 92.0000 cm |
| Exit pupil-image plane | 62.2817 cm |

In order to dispel any apprehension concerning the possibility of a drastic increase in complexity due to the addition of the tertiary mirror, the following table indicates the effect of secondary and tertiary misalignment on the performance in terms of RMS wavefront errors (optical path difference) and in terms of induced aberrations (increase of spot size):

| | INCREASE OF RMS-OPD PER UNIT MISALIGNMENT ($\lambda$ = 632.8 nm) | INCREASE OF GEOMETRIC SPOT DIAMETER PER UNIT MISALIGNMENT |
|---|---|---|
| SECONDARY | | |
| Despace | 0.025 $\lambda/\mu m$ | 0.032 $\mu rad/\mu m$ |
| Decenter | 0.0013 $\lambda/\mu m$ | 0.0036 $\mu rad/\mu m$ |
| Tilt | 0.0008 $\lambda/\mu rad$ | 0.0023 $\mu rad/\mu rad$ |
| TERTIARY | | |
| Despace | 0.0016 $\lambda/\mu m$ | 0.0021 $\mu rad/\mu m$ |
| Decenter | 0.016 $\lambda/mm$ | 0.048 $\mu rad/mm$ |
| Tilt | 0.004 $\lambda/mrad$ | 0.014 $\mu rad/mrad$ |

From the foregoing table, it will be noted that the tertiary is 15 to 200 times less sensitive than the alignment of the secondary mirror.

In summary, it is believed clear that the present invention provides a most feasible and practical solution to the problem of the construction of a highly corrected all-reflective telescope. In addition to its superior performance as described, the annular field of its output is particularly adapted to accommodate a set of different instruments, with each being assigned a discrete portion of the field. This enables a space vehicle to be more versatile, it allows for the accommodation of back-up instruments which may be used in the case of a failure, and generally facilitates the collection of maximum data per space mission.

What is claimed is:

1. A three-mirror telescope comprising:
   a primary mirror of ellipsoidal configuration, and having an opening central about a central axis thereof;
   a secondary mirror of hyperboloidal configuration facing said primary mirror, said secondary mirror being of a smaller diameter than the primary mirror and positioned symmetrically with the axis of the primary mirror, whereby light from a scene being viewed passes around and by the secondary mirror, and then is reflected through said opening in said primary mirror; and
   imaging means, including a tertiary mirror of ellipsoidal configuration positioned to receive light from said secondary mirror, for reflecting an image of the scene being viewed to a plane for viewing.

2. A telescope as set forth in claim 1 wherein said imaging means comprises a plane mirror positioned in an optical path including said tertiary mirror and is oriented at an angle of 45° with respect to said axis.

3. A telescope as set forth in claim 2 wherein said tertiary mirror is positioned symmetrical with the optical axis of the telescope and with said opening in said primary mirror, and said plane mirror is positioned and sized to enable light to pass around it from said secondary mirror to said tertiary mirror and to receive reflected light from said tertiary mirror and project an image in a plane which is parallel to but spaced from said axis.

4. A telescope as set forth in claim 2 wherein said plane mirror has a central opening, said tertiary mirror is positioned symmetrically about a line perpendicular to said axis and receives reflected light from said plane mirror and reflects this light back through said opening in said plane mirror, whereby a final image is created in a plane which is parallel with but displaced from said axis.

* * * * *